United States Patent [19]
Spector

[11] Patent Number: 5,765,141
[45] Date of Patent: Jun. 9, 1998

[54] COMPUTERIZED MERCHANDISING SYSTEM

[76] Inventor: Donald Spector, 380 Mountain Rd., Union City, N.J. 07080

[21] Appl. No.: 540,251

[22] Filed: Oct. 6, 1995

[51] Int. Cl.⁶ .................................................. G06F 17/60
[52] U.S. Cl. .......................... 705/14; 705/21; 705/35; 705/36; 364/479.05; 364/479.07; 235/375; 235/383
[58] Field of Search ............................ 395/201, 214, 395/216, 217, 221, 235, 236, 237, 239; 704/1, 14, 16, 17, 21, 35–37, 39; 235/375, 383; 364/479.01, 479.02, 479.05, 479.06, 479.07

[56] References Cited

U.S. PATENT DOCUMENTS

| | | | |
|---|---|---|---|
| 5,083,782 | 1/1992 | Nilssen | 395/235 |
| 5,231,571 | 7/1993 | D'Agostino | 395/236 |
| 5,237,499 | 8/1993 | Garback | 395/205 |
| 5,243,174 | 9/1993 | Veeneman et al. | 235/381 |
| 5,408,417 | 4/1995 | Wilder | 395/205 |
| 5,426,594 | 6/1995 | Wright et al. | 395/200.36 |
| 5,440,479 | 8/1995 | Hutton | 395/226 |
| 5,513,117 | 4/1996 | Small | 364/479.03 |

Primary Examiner—Gail O. Hayes
Assistant Examiner—Joseph Thomas
Attorney, Agent, or Firm—Michael Ebert

[57] ABSTRACT

A computerized merchandising system useable by a corporation associated with a group of stores selling goods, the system acting not only to induce a consumer to purchase these goods, but also to induce this consumer to buy shares of stock issued by the corporation, for either choice is to his possible advantage. On the site of each store is a satellite computer which prints out and supplies a certificate to a buyer who pays its face value. The certificate is redeemable within a specified period, and when redeemed then entitles the buyer either to acquire from any one of the stores, goods whose total sales price is equal to the face value of the certificate, or to acquire shares of stock in the corporation whose market value at the time the certificate was purchased was then equal to its face value. If therefore the market value of the shares at the time of redemption has appreciated above the face value of the certificate, the buyer stands to gain by acquiring the shares. But the buyer cannot suffer a loss, for he has the option of acquiring the goods in lieu of the stock.

7 Claims, 1 Drawing Sheet

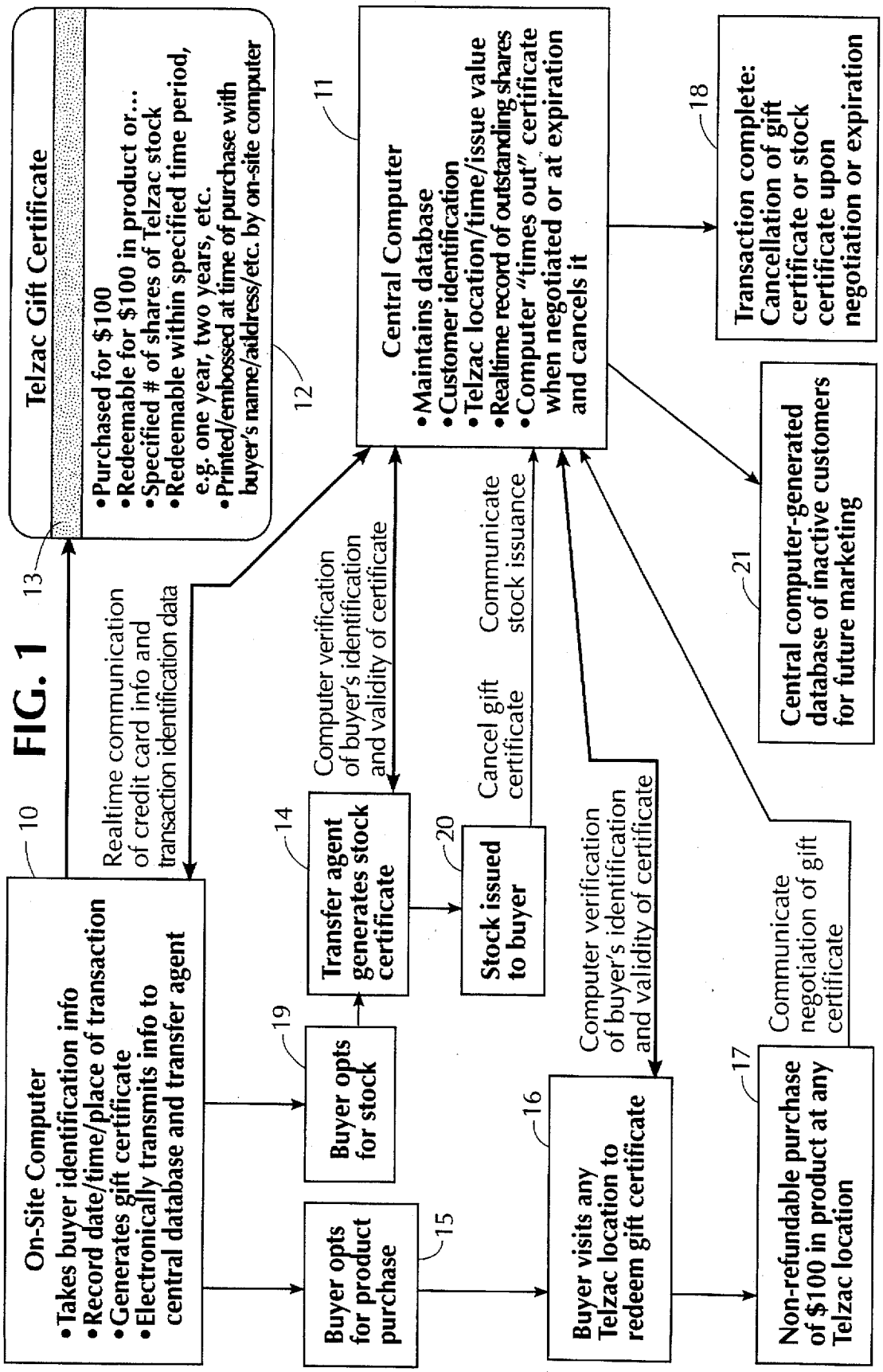

COMPUTERIZED MERCHANDISING SYSTEM

BACKGROUND OF INVENTION

1. Field of Invention

This invention relate generally to computerized merchandising systems, and in particular to a system useable by a corporation associated with a group of stores that sell goods to consumers, the system acting not only to induce a consumer to purchase these goods, but also to induce this consumer to buy shares of stock issued by the corporation, for either choice is to the possible advantage of the consumer.

2. Status of Prior Art

A conventional gift certificate is one usually given as a gift which entitles the recipient to acquire merchandise from a commercial establishment or store whose selling price corresponds to the face value of the certificate. In purchasing a gift certificate, the buyer pays its face value. Thus if a gift certificate has a face value of $100 and can be redeemed at a a Saks Fifth Avenue department store, the recipient is able to acquire at this store goods whose total selling price is $100. But the buyer of the certificate has no right to acquire stocks from Saks nor is he given any incentive to do so.

The concern of the present invention is with a computer-generated certificate which accords a buyer who purchases this certificate at its face value a dual option which can be exercised during the specified period in which the certificate remains in effect. By redeeming the certificate, the buyer can either acquire goods from a store associated with a corporation whose selling price is equal to the face value, or he can acquire shares of stock in the corporation whose market value at the time the certificate was purchased was then equal to the face value of the certificate. In a sense, therefore, it is the buyer of the certificate who is given a gift or bonus, for if at the time the certificate is redeemed, the shares of stock have risen in value, the buyer stands to gain by acquiring the stock rather than the goods.

To appreciate the advantages of a computer-generated certificate in accordance with the invention, it is necessary to understand the nature of financial stock and how it is traded. Stock is an instrument certifying shares in the ownership of a corporation. Thus one who holds 20 shares of common stock in General Motors, is a part owner of this corporation.

Stock yields no dividends until the claims of bondholders are first satisfied. Preferred stock is entitled to dividends of a specified percentage per annum before common stock can receive dividends derived from profits earned by the corporation. Because of the need of corporations for ready cash in order to expand or for some other purpose, there are now stock exchanges in most major cities of the world which trade in stock. But many securities are now traded through computers and communication networks without the benefit of a stock exchange. Computerized trading has not only opened up a large market in over-the-counter trading, but has given rise to trading on an international scale. And personal computers and modems which link one computer with many others, have made possible trading activity around the clock.

When a corporation which operates, controls or owns a chain of retail stores or other commercial establishments wishes to raise capital and issues shares of stock for this purpose, there is nothing to induce consumers of products or services available in these stores to also buy shares of stock in the corporation.

A potential investor is normally persuaded to buy shares of stock being offered by a corporation by a prospectus published by the corporation which explains why the corporation is destined to become more profitable, thanks to the infusion of capital, and thereby make its stock appreciate in value. Or the inventor might be induced to buy the stock because of an account in a financial journal such as Business Week which paints a favorable picture of the corporation. Or the investor might be induced by a stock broker in whom he has faith to buy the stock.

But whatever it is that induces an investor to buy stock in a corporation, the typical investor is aware that he is running a risk, for market conditions are often volatile, and a share of stock in a blue chip corporation, bought at $100 may be traded only few weeks later at $50 a share.

Hence the factor which discourages a typical investor from acquiring shares of stock, even in a corporation having an impressive track record, is the fear that the stock will in a fairly short time depreciate in value. Under present trading practices no insurance is available to protect a purchaser of shares against a loss resulting from the depreciation of the stock.

The risk of a loss appears to be greatest with newly-formed public corporations which make a stock offering to raise capital. Since the corporation has no stock track record which would assure a potential investor that it is not a fly-by-night operation, a stock offering from this corporation faces serious difficulties. The need exists, therefore, for a system for promoting the sale of shares of stock in a corporation by assuring the buyer of the shares that he will suffer no substantial loss in doing so even if the shares thereafter drop in their market value.

Of prior art background interest are the following references:

A. The D'Agostino U.S. Pat. No. 5,231,571 which discloses a computer-controlled system for providing personal financial services, including the purchase of stocks and bonds;

B. The Garbach U.S. Pat. No. 5,237,499 which discloses a computer-based system to a specific venue from individual members of a sponsored group;

C. The Hutton U.S. Pat. No. 5,440,479 which discloses a computer-based floral kiosk system which interacts with a floral ordering network and allows users to select or create floral arrangements;

D. The Wright U.S. Pat. No. 5,426,594 which discloses an electronic greeting card communication system in which a user of the personal communicator can select and pay for an electronic greeting card and send it to another personal communicator.

SUMMARY OF INVENTION

In view of the foregoing, the main object of this invention is to provide a computerized merchandising system useable by a corporation associated with a group of commercial establishments or stores selling goods which by means of a computer-generated certificate gives a buyer of this certificate a dual option of either acquiring shares of stock issued by the corporation or goods sold in these stores.

A significant advantage of this system is that it induces a buyer to purchase the certificate at its face value, for the certificate is redeemable within a specified period running from its date of purchase and may be redeemed either to acquire goods from the stores whose total selling price is equal to the face value of the certificate or to acquire shares of stock whose market value at the time the certificate was purchased is equal to the face value of the certificate.

Thus in the event that at the time the certificate is redeemed, the shares of stock have appreciated in value, the buyer of the certificate stands to gain by this transaction. But if the shares have fallen in value below the face value of the certificate, the buyer of the certificate may then elect to acquire goods whose selling price is equal to the face value of the certificate, so that in no event does the buyer of the certificate suffer a loss. Hence a computerized merchandising system in accordance with the invention relieves an investor of the risk normally entailed in acquiring shares of stock.

The appeal of a computer-generated certificate in accordance with the invention resides in the fact that it offers a potential buyer of the certificate at its face value a double-edged inducement, one being that when the certificate is redeemed, the stock to which the certificate holder is then entitled, may have risen sharply in market value, the other being that if the stock has then fallen in market value, the certificate holder can instead acquire goods whose selling price is equal to the face value of the certificate.

Briefly stated, these objects are accomplished in a computerized merchandising system useable by a corporation associated with a group of stores selling goods, the system acting not only to induce a consumer to purchase these goods, but also to induce this consumer to buy shares of stock issued by the corporation, for either choice is to his possible advantage. On the site of each store is a satellite computer which prints out and supplies a certificate to a buyer who pays its face value. The certificate is redeemable within a specified period, and when redeemed then entitles the buyer either to acquire from any one of the stores, goods whose total sales price is equal to the face value of the certificate, or to acquire shares of stock in the corporation whose market value at the time the certificate was purchased was then equal to its face value. If therefore the market value of the shares at the time of redemption has appreciated above the face value of the certificate, the buyer stands to gain by acquiring the shares. But the buyer cannot suffer a loss, for he has the option of acquiring the goods in lieu of the stock.

The system is monitored by a central computer which is linked to the satellite computers and maintains a real time record of the outstanding share of stock in the corporation, and the options to these shares resulting from the issuance of certificates by the satellite computers.

The central computer communicates with a transfer agent and authorizes this agent, when presented by a buyer with a certificate to be redeemed, to issue to this buyer the shares of stock to which he is entitled.

BRIEF DESCRIPTION OF DRAWING

For a better understanding of the invention, as well as other features and advantages thereof reference is made to the accompanying drawing whose single FIGURE is a block diagram of a computerized merchandising system in accordance with the invention.

DETAILED DESCRIPTION OF INVENTION

Referring now to the drawing, there is shown therein a computerized merchandising system in accordance with the invention which is useable by a corporation associated with a group or chain of stores selling goods (or services), the system being adapted not only to promote the sales of these goods, but also the purchase of shares of stock issued by the corporation.

We shall by way of example assume that the corporation is named Telzac Corporation, and that sold in the stores associated with this corporation are toys in the $5 to $100 range. We shall further assume that shares of stock in this corporation at the time it was first being offered had a market value of $5 a share.

Each of the stores in the chain is provided with an on-site satellite computer 10. The satellite computers in all of the stores are linked with a central computer 11 which monitors the operations of the satellite computers and is located at the headquarters of the Telzac Corporation or at any other appropriate site. The central computer is also linked with a transfer agent who issues shares of stock in the corporation.

When a consumer enters a store equipped with an on-site computer 10, a salesperson then offers to sell him a certificate 12 whose face value we shall assume, by way of example, is $100. This certificate is redeemable within one year from its date of purchase or within any other specified effective period which may be shorter or longer than one year, the certificate being invalid upon expiration of this period.

Certificate 12, when in due course redeemed, entitles its buyer either to acquire goods in any one of the chain of stores whose selling price is equal to the $100 face value of the certificate, or to shares of stock in the corporation whose market value at the time the certificate is purchased was then equal to the $100 face value of the certificate. If, therefore, at the time the certificate is purchased, the market value of Telzac Corporation stock is $5 a share, then when the certificate is redeemed, the buyer of the certificate is entitled to 20 shares regardless of the market value of this stock at the time of redemption.

Should the consumer accept the offer and gives the sales person $100 for the purchase of a certificate 12, the following actions then take place:

The sales person through the computer keyboard enters into on-site computer 10 the identification of the buyer of the certificate as well as the time and place of this transaction. The data entered into the computer is transmitted to central computer 11. The same data is conveyed to a printer associated with the on-site computer 10 which prints out certificate 12, the certificate having printed thereon the buyer's name and address and possibly his social security number.

Certificate 12 also has printed thereon its face value $100, this being the purchase price of the certificate. And further printed thereon is that it is redeemable within one year from the date on which the certificate was purchased, or within any other specified effective period, after which period the certificate is expired.

The certificate also indicates that upon its redemption, the identified buyer is entitled to receive 20 shares of Telzac Corporation stock which at the time the certificate was purchased had a market value of $5 a share. At the time of redemption, the buyer of the certificate is entitled to receive these 20 shares regardless of what then is their market value. The certificate further indicates that upon its redemption, the buyer may in the alternative receive goods in any of the Telzac stores whose total selling price is the $100 face value of the certificate.

Thus the number of shares a buyer of the certificate is entitled to receive upon redemption is predetermined, and he stands to gain if the market value of these shares has risen so that the shares are worth more than at the time the certificate was purchased.

But should the buyer, when redeeming his certificate, elect instead to acquire goods, he may also gain if the store price of the goods has fallen. Thus if at the time the certificate was purchased, the particular goods in which the buyer is interested were being sold at $120, but at the time of redemption they were being sold at $100, the buyer is entitled to these goods at their then current price.

Certificate 12 is provided with a magnetic stripe 13 such as a stripe of the type included in a credit card, in which the data printed on the certificate is magnetically recorded in digital terms so that it can later be magnetically read out in a reader to verify the certificate.

Maintained in central computer 11 in its data base is a real time record of the outstanding shares of the corporation operating the system. Each time central computer 11 receives from a satellite computer 10 data as to the issuance of a certificate 12, the central computer then reserves an option for the shares to which the buyer of the certificate is entitled should he redeem this certificate.

Data stored in central computer 11 is communicated to a transfer agent 14 authorized to issue stock to any holder of a valid certificate who wishes to redeem the certificate to acquire shares of stock rather than goods.

When, as indicated in block 15, the certificate buyer within the redemption period opts to redeem his certificate and obtain goods whose selling price is equal to the face value of the certificate, the buyer, as indicated in block 16, then goes to any Telzac store to obtain these goods. At the store the certificate is magnetically read and the resultant data communicated to central computer 11 to verify the buyer's identification and the validity of the certificate which ceases to be valid after the effective redemption period expires.

When the holder of the certificate makes his non-refundable $100 purchase at a Telzac store location, as indicated in block 17, this transaction is communicated to central computer 11 which, as indicated in block 18, then cancels the certificate whose issuance was recorded in the central computer. Hence should one try to reuse the certificate, it will be rejected by the system.

But if the buyer elects to redeem his certificate by acquiring stock, as indicated in block 19, this fact is transmitted to transfer agent 14 who reads the gift certificate and transmits the data to central computer 11 which verifies the buyer's identification and the validity of the certificate.

As indicated in block 20, the transfer agent, when presented with a valid certificate, then issues to the buyer the shares of Telzac Corporation stock to which he is entitled. This transaction is transmitted to the central computer 11 which in block 18 then cancels the redeemed certificate.

As indicated in block 21, the computer-generated data base in central computer 11 is scanned to extract therefrom the names and addresses of buyers that no longer hold unredeemed certificates. The purpose of this scanning is to provide a list of inactive customers who can be contacted in future marketing efforts.

Thus in a computerized merchandising system in accordance with the invention, there exists a bi-directional link between the satellite computers in the Telzac stores which sell the certificates as well as the goods, the central computer at the corporate headquarters which monitors all of the operations of the system, and the transfer agent who issues stock to holders of the certificates who elect to acquire stock rather than goods.

The appeal of a computer-generated certificate in accordance with the invention resides in the fact that it offers a buyer a double-edged inducement to purchase the certificate.

The up side of the certificate is that when redeemed, the shares of stock to which the buyer is then entitled may have a far greater value than the stock had at the time the certificate was purchased. The down side is that at the time of redemption, the stock may have depreciated in value, in which event the buyer may opt to acquire goods whose selling price is equal to the purchase price of the certificate. Hence no loss is involved in the down side of the certificate.

While a buyer of a certificate cannot predict whether the stock he has an option to acquire will during the redemption period appreciate in market value, he is in a position to judge whether the goods he has an alternative option to acquire represent good value, for these goods are available for inspection in the store in which the certificate is purchased.

It is for this reason that a corporation which adopts the system to attract customers for the goods being sold in its stores as well as to sell stock to these customers would be well advised to offer goods in its stores which are appealing to customers and represent good value. What the system does is to tip the balance in favor of the corporation, for should the customer be hesitant about acquiring the goods, this hesitation is overcome by the possibility of the making a profit on the stock, and should the customer be hesitant about acquiring the stock, this hesitation is overcome by the possibility of obtaining good quality goods in lieu of the stock.

A system in accordance with the invention is applicable to any corporation which controls, operates, or owns a group or chain of commercial establishments which sells goods to customers, for the system serves to promote such sales while offering a greatly expanded outlet for the sale of its stock.

Thus if the Ford Motor Company had good reason to believe that its stock was being undervalued in the market place, it could by way of the system offer a higher value for its stock against the purchase price of a Ford car. Ford, in stores or agencies selling Ford cars, could there offer a certificate for any value it chooses on its stock against the face value of the certificate.

Thus if Wall Street analysts maintain that a share of Ford stock is worth $50 a share and Ford management is convinced that a share is actually worth $60, under present conditions it has little recourse but to argue with these analysts, or to buy back its shares which it may not have the resources on hand to do so. But with a system in accordance with the invention, Ford can use its goods to go to consumers, for it now has a new base to reevaluate its stock at $60 a share.

Ford can now offer to consumers who turn up at Ford agencies a computer-generated certificate having a face value of $6,000 which, when redeemed within a specified period, either entitles the buyer to 100 shares of Ford stock or a Ford car selling at $6,000. Hence a Ford customer runs no risk in buying a certificate and may come out well ahead if the stock appreciates in value during the redemption period.

While there has been shown a preferred embodiment of the invention, it will be appreciated that many changes may be made thereon without departing from the spirit of the invention.

I claim:

1. A computerized merchandising system useable by a corporation associated with stores selling goods to consumers, the system being adapted to promote the sale in these stores of shares of stock issued by the corporation, said system comprising:

A. a satellite computer installed in each store provided with a printer, which receives data relating to a buyer entered into the computer, and prints out and supplies to the buyer who pays to the store its face value, a certificate which identifies him and entitles him when the certificate is redeemed within a specified period running from the date on which the certificate was purchased, to either of the following:
(1) the right to acquire from said store at the time the certificate is redeemed, goods whose total selling price is equal to the face value of the certificate; or
(2) the right to acquire from a transfer agent shares of said stock whose value at the time the certificate was purchase is equal to said face value, whereby should the buyer elect to acquire said stock he stands to gain if the stock has appreciated in value, and should the buyer elect to acquire said goods, he will have already paid for them and, therefore, suffer no loss; and B. a central computer linked to each satellite computer and to said transfer agent to monitor the operation of the system and validate the transactions.

2. A system as set forth in claim 1, in which the certificate has printed thereon the identification of the buyer, the time, date and place of its purchase, the face value of the certificate and the period in which it is redeemable.

3. A system as set forth in claim 1, in which the central computer maintains a real time record of the outstanding shares of stock of the corporation and the options thereto resulting from the issuance of certificates by the satellite computers linked to the central computer.

4. A system as set forth in claim 1, in which the central computer authorizes the transfer agent to which it is linked to issue the shares only if the certificate presented for redemption is verified.

5. A system as set forth in claim 2, in which the certificate includes a magnetic stripe on which is recorded the data printed thereon.

6. A system as set forth in claim 5, in which each store is provided with a reader to read the magnetic stripe to verify the certificate when presented for redemption.

7. A system as set forth in claim 5, in which the transfer agent is provided with a reader to read the magnetic stripe when the certificate is presented for redemption.

* * * * *